//73-654

OR 3,783,680

United States Patent
Mason

[11] 3,783,680
[45] Jan. 8, 1974

[54] MULTIPOINT VIBRATION MONITORING SYSTEM

[75] Inventor: Charles H. Mason, Paducah, Ky.

[73] Assignee: The United States of America as represented by the United States Atomic Energy Commission, Washington, D.C.

[22] Filed: July 12, 1972

[21] Appl. No.: 270,883

[52] U.S. Cl. .................................. 73/71.2, 73/70
[51] Int. Cl. ............................................ G01h 1/08
[58] Field of Search .................. 73/70, 71, 71.1, 73/71.2, 71.3, 71.4

[56] References Cited
UNITED STATES PATENTS
3,394,581  7/1968  Johnson ........................ 73/71.2 X Primary Examiner—James J. Gill
Attorney—John A. Horan

[57] ABSTRACT

A multipoint vibration monitor has been provided for monitoring vibration emanating from rotating equipment. A plurality of seismic-type detectors are placed at various vulnerable points on the equipment. These detectors are electromechanical generators whose output signals are proportional to both frequency and magnitude of vibration in a single plane, thereby reducing errors introduced by extraneous vibrations of a transient nature which would give false indications. A unique multichannel electronic circuit is provided into which the detector signals are fed to remotely monitor the plurality of detectors and provide both an alarm and point location of abnormal vibrations.

10 Claims, 4 Drawing Figures

MULTIPOINT VIBRATION MONITORING SYSTEM

BACKGROUND OF THE INVENTION

This invention was made during the course of, or under, a contract with the United States Atomic Energy Commission.

This invention relates to vibration monitoring and more specifically to a system for multiple point vibration remote monitoring of a machine or machines which provide multiple abnormal vibration level alarms or ultimate machine shutdown at a maximum vibration level with means for indicating the location of a detector sensing the abnormal vibration level.

It has been the practice in plants where there are a large number of rotating machines, or other mechanical equipment, to provide some means of monitoring the vibration levels of these machines during operation. Particularly with the present use of heavy rotating machines, such as compressors, generators and motors, for transferring large quantities of energy with a minimum of supervision, it is of prime importance to provide some means of remote monitoring to prevent failure especially destructive failure. The increasing demands that are being placed on such machines require that a detection system be provided that will detect changes in machine conditions and provide protection from destructive failure.

Basically, there are two types of failure: (1) sudden or abrupt with no period of forewarning; and (2) failures that are preceded by a period of machine deterioration. The former case has been rare and a detection system is of increasing importance as the duration of the period of forwarning decreases. This becomes even more important as machines are up-rated for higher power levels.

There are various known prior art vibration monitoring systems which include vibration sensors that are mounted on machines whose vibration is to be monitored. These systems are complicated by the fact that all known prior art vibration sensors have non-linear outputs. Therefore, it has been difficult to provide a system for remote monitoring at a single location of a large number of vulnerable machine points in a large plant area without elaborate calibrating circuitry for each sensor point.

Some systems have taken the form of portable vibration detectors in which a unit is carried to machines suspected of having excessive vibration. Such a device does not provide for continuous monitoring of the machine and thus does not have the capability of providing a warning system.

Other forms of continuous monitoring have been provided by systems in which the sensor is in the form of a stationary plate mounted on the machine and a nozzle through which a small stream of air is directed onto the plate and changes in backpressure are measured to produce a signal proportional to the vibration. This detection method, although having capability for continuous monitoring, required such a small spacing (~0.006 in.) between the air nozzle and the fixed plate that during normal start and stop operations the fixed plate often bumped against the nozzle. Further, such a system required the additional expense of an air supply and tubing.

Therefore, it will be obvious that there is a need for an improved vibration monitoring system for remote monitoring of multiple points on a machine or a large group of machines which is accurate and requires a minimal amount of circuitry and maintenance.

SUMMARY OF THE INVENTION

In view of the above need, it is an object of this invention to provide a system for multiple point vibration monitoring of rotating machines which can accommodate a large number of vibration detectors and accurately monitor a plurality of machines with a minimum of expense and maintenance.

Another object of this invention is to provide a vibration detector system having many sensors placed at various points on a plurality of rotating machines to detect a low vibration level, a high vibration level, and a maximum machine trip level and to provide alarms for each of these conditions.

Briefly, this invention is a multipoint vibration monitoring system for monitoring vibrations in a plurality of rotating machines, comprising: a plurality of vibration sensors located at predetermined monitoring points on the rotating machines, each of the sensors including a magnetic core, a movably mounted winding disposed about the core and constrained to move in a single plane so that movement of the winding relative to the core due to vibration causes a signal to be generated therein proportional to the magnitude of vibration; a plurality of signal level detector channels connected to corresponding ones of the plurality of sensors, each of the detector channels including: (a) a low vibration level detector responsive to a predetermined low signal level below the normal output level of the corresponding sensor for generating a low vibration level alarm signal at an output thereof when the output of the corresponding sensor falls below the predetermined low signal level, (b) a high vibration level detector responsive to a predetermined high signal level above the normal output level of the corresponding sensor for generating a high vibration alarm signal at an output thereof when the output of the corresponding sensor exceeds the predetermined high signal level, and (c) a maximum vibration level detector responsive to a predetermined maximum signal level output above the high signal level of the corresponding sensor for generating a trip signal at an output thereof when the output of the corresponding sensor exceeds the maximum signal level; a display indicator means connected to the outputs of each of the signal level detector channels for visual indication of a particular one of the sensors detecting an alarm condition and indicating the activated one of the signal level detectors; and switching means connected to the outputs of each of the maximum vibration level detectors of signal level detector channels for disconnecting the power to a corresponding one of the machines in response to the signal from the corresponding one of the signal level detector channels.

DETAILED DESCRIPTION

Figure 1:
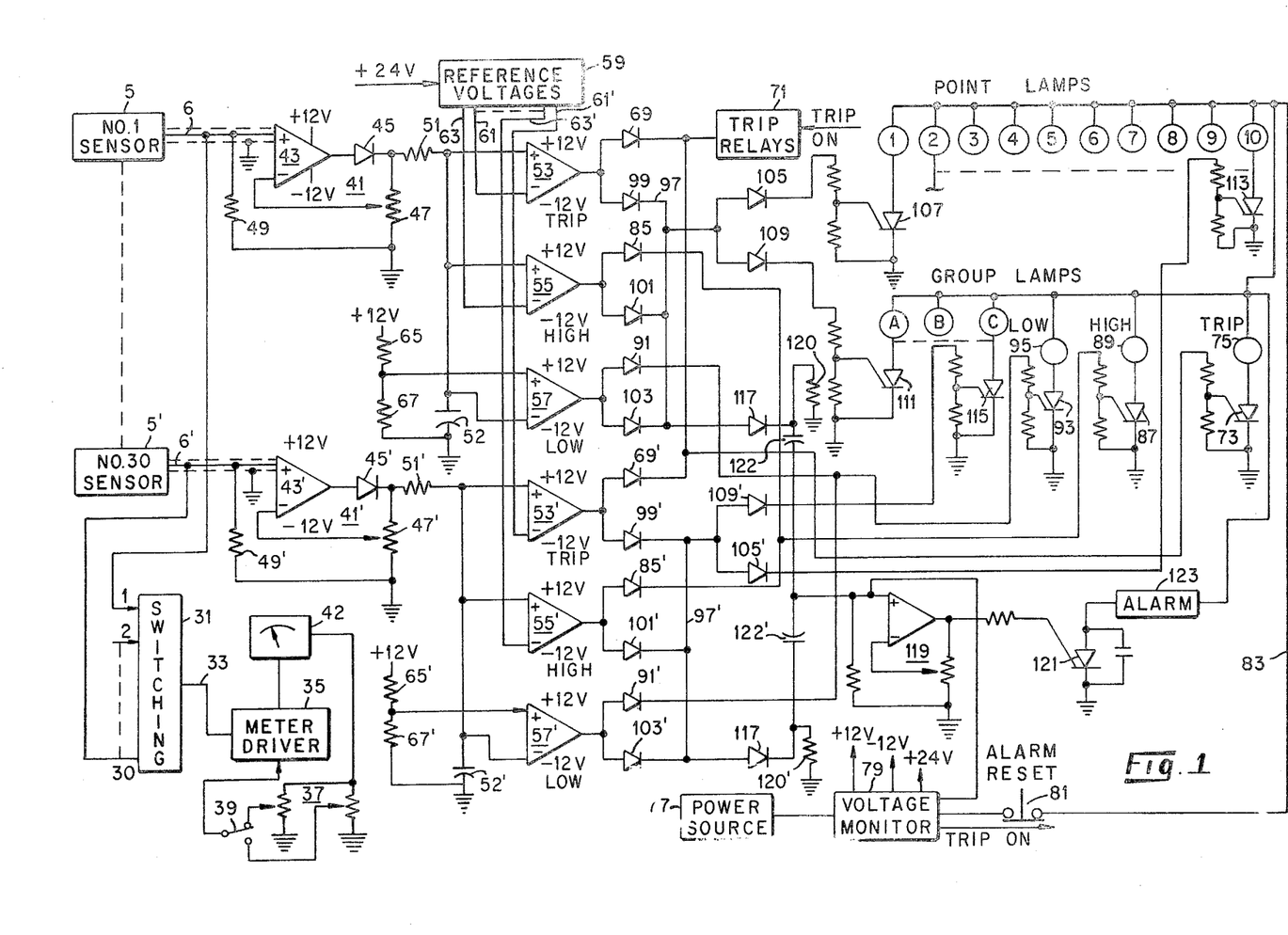
FIG. 1 is a schematic diagram of a multipoint vibration detection system according to the present invention.

Referring now to FIG. 1, there is shown a system for thirty sensor channels of which the circuitry for only two typical channels is shown to simplify the drawing and still provide a complete description of the system. It will be understood that any number of sensor channels may be used depending upon the application and that the system described here is illustrative of the flexibility of the present multipoint vibration detection system.

Figure 2:
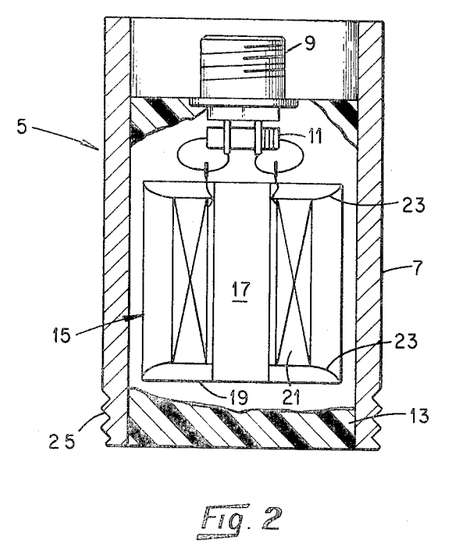
FIG. 2 is a cross sectional view of a sensor shown in block form in FIG. 1.

Each channel includes a vibration sensor 5, shown in FIG. 2, which is the heart of this invention. The sensor is preferably an amplitude and frequency sensitive electromagnetic generator such as the Geophone Model HS-J produced by Geo Space Corporation of Houston, Tex. The term "sensor" in this application denotes a complete calibrated assembly, as shown in FIG. 2. The assembly includes the housing 7, electrical connector 9, calibrating resistor 11, encapsulating material 13 and the basic vibration sensing element 15. The encapsulating material is an appropriate potting compound which holds the sensing element and electrical connections in place within the cylindrical housing 7.

The sensing element 15 includes a magnetic core 17 disposed in a container 19. The core 17 is surrounded by a movable coil 21 which "floats" between a pair of annular leaf springs 23, one connected to the top and the other to the bottom of the container 19. A small vibratory force causes the coil 21 to be displaced by an amount proportional to the force exerted thereon. The sensor is self-powered in that displacement of the coil 21 along the axis of core 17 generates a small voltage proportional to the distance and rate of movement.

The sensing element 15 has a natural resonant frequency. It is less sensitive to vibration below its natural resonant frequency but with proper damping, as by choice of the proper calibrating resistor 11 connected across the coil 21, produces an output that is linear at frequencies above its natural resonant frequency. Each sensor is calibrated so that their output voltages are equal at a frequency of 19.5 Hz, and thus can be interchanged or replaced without recalibrating the circuit. The output is responsive to three variables: temperature, frequency and amplitude of vibration. However, the change in output due to temperature fluctuation is only 0.095 percent/degree F. When the sensing element is attached to a massive machine drive train, as by screwing the threaded portion 25 of the housing 7 into a threaded receiver portion on the machine (not shown), the temperature is essentially constant and output changes due to temperature fluctuations are insignificant.

Changes in frequency of vibration above the natural resonant frequency and changes in amplitude of vibration produce the same results within the sensing element 15 in that the output is relative to the inches/second travelled by the generating coil 21.

Drive trains of fixed rotational speed produce vibrations of a fixed frequency; therefore, the sensor 5 produces an output that is directly related to the amplitude of the vibration of the machine to which it is attached. Since the sensing coil 21 is constrained to movement in only one plane, the output is a measure of vibration in that plane only as vibration at right angles to this plane produces little or no output. Thus, by proper placement of three of the sensors 5, the displacement measurements in the X, Y, and Z planes of a machine can be made separately.

The metering of the sensor 5 must be accomplished by using a system that does not load the input, thus introducing cable length considerations. Referring again to FIG. 1, the output of each sensor 5 is connected to a separate input terminal of a selector switch 31 whereby any one of the sensors may be selected and the signal coupled through output lead 33 to the output of a meter driver 35. The meter driver 35 consists of an integrated circuit operational amplifier and is provided with a dual path gain control circuit 37, either path of which may be selected by switch 39 to provide feedback to the driver 35. The dual path gain control circuit 37 is connected in series with an A.C. meter 42 which is, in turn, connected to the output of the driver 35. The dual gain controls provide dual ranges that can be calibrated to the particular application. This type circuit is used for vibration monitors that are to be used on dual speed drive trains. The meter 42 indicates the vibration amplitude in units of thousandths of an inch peak-to-peak displacement. The metering circuit provides a visual indication only and may be made up of more than one meter circuit if it is necessary to continuously monitor particular points.

In order to provide an alarm indication, the sensor 5 outputs must be properly conditioned before they are applied to any alarm or control actuating circuit. The A.C. voltage signals from the sensors 5 which are normally of a frequency equal to the rotational speed of the equipment being monitored are fed to corresponding channel signal conditioners which are connected as comparators 41. Each signal conditioner includes an operational amplifier 43 having its non-inverting input (+) connected to the corresponding remote sensor 5 output through shielded cables 6, a load resistor 49 connected between the (+) input of amplifier 43 and ground potential, a diode 45 connected in series with the output of amplifier 43, a gain adjusting potentiometer 47 connected between the cathode of diode 45 and ground potential with the adjustable arm thereof connected to the inverting input (−) of amplifier 43, a capacitor 52, and a resistor 51 connecting the cathode of diode 45 to capacitor 52 which is, in turn, connected to ground potential. The output of amplifier 43 is either full "on" or full "off." The A.C. signal at the (+) input of amplifier 43 will switch the amplifier "on" once for each position half cycle.

The output from amplifier 43 through diode 45 charges capacitor 52 through resistor 51 and provides a reference voltage at potentiometer 47. This reference voltage is fed back to the inverting (−) input of amplifier 43, the comparator switches "on" when the input signal from the corresponding sensor 5 is greater than this reference voltage and "off" when the signal is less than the reference voltage. The diode blocks the capacitor discharge path back through amplifier 43. Adjusting potentiometer 47 establishes the ratio of the charge on capacitor 52 and the reference voltage at the adjustable arm of potentiometer 47, thus the charge on capacitor 52 is proportional to the average positive peak of the sensor 5 A.C. output voltage.

The single cycle charging rate of capacitor 52 is limited by the value of resistor 51, typically 56 K ohms. Shock and seismic noise of only a few cycles have little or no effect on the capacitor 52 charge. The signal conditioner output, the charge on capacitor 52, is not frequency sensitive but does have a ripple. The magnitude of the ripple is a function of the cyclic charging and discharging or input frequency. At low frequencies the ripple magnitude will be a few millivolts and provide a useful benefit to be discussed later.

The sensors 5 provide low impedance paths for electrical noise picked up on the interconnecting cables 6, thereby eliminating false indications due to the electrical environment. Failure of the sensor 5 or cabling 6 may remove the low impedance path; thus the input impedance of the signal condition must be capable of bleeding off the electrical noise when the pickup cable is open at the sensing element.

The cable 6 may be shielded pair (one conductor not shown). The shield and one of the two conductors are grounded at the signal conditioner 41 input. Thus, any stray A.C. pickup on the shield and grounded conductor produce no problem. The ungrounded conductor connected to the amplifier 43 has a low impedance path to ground through the sensor 5. Failure of the sensor will produce one of two effects: (1) open coil 12 (FIG. 1) leaves a path to ground through the calibrating resistor 11, and (2) shorted coil 12 leaves a path to ground through the resistance of the conductor only. If the sensor is disconnected, the low resistance path is removed. However, the A.C. pickup on the shielded but ungrounded conductor will be very small in magnitude and the load resistor 49 (typically 270 K ohm) will provide sufficient bleed to ground to eliminate false operation. It has been determined that when using a shielded pair cable without conduit, cable lengths of 150 feet require no trimming of the signal conditioner input impedance.

The output of each signal condition 41 is applied to a plurality of level detectors to monitor the voltage across capacitor 52 and continuously compare that voltage to select reference voltage levels. Each channel contains three level detectors in the form of operational amplifiers 53, 55 and 57 corresponding to a trip vibration level, a high vibration level and a low vibration level. The output of signal conditioner 41 is connected to the non-inverting (+) input of both operational amplifier 53 and 55 and to the inverting (−) input of operational amplifier 57. The reference voltages for the trip vibration level and the high vibration alarm level are supplied individually from a highly regulated multiple output reference voltage source 59. Each reference level may be adjusted individually or grouped, depending on the application and are applied to the inverting inputs of operational amplifiers 53 and 55 through lines 61 and 63, respectively. The reference for the low vibration level is supplied from a voltage divider consisting of resistors 65 and 67 connected in series between the positive system supply voltage and ground potential. The common connection point of resistors 65 and 67 is connected to the non-inverting input of operational amplifier 57. Amplifiers 53 through 57 act as voltage comparators; and as long as the non-inverting input voltage is lower than the inverting input voltage, the output will remain negative but when the non-inverting input voltage just exceeds the inverting input voltage, the output quickly flips to a positive voltage level.

Figure 3:
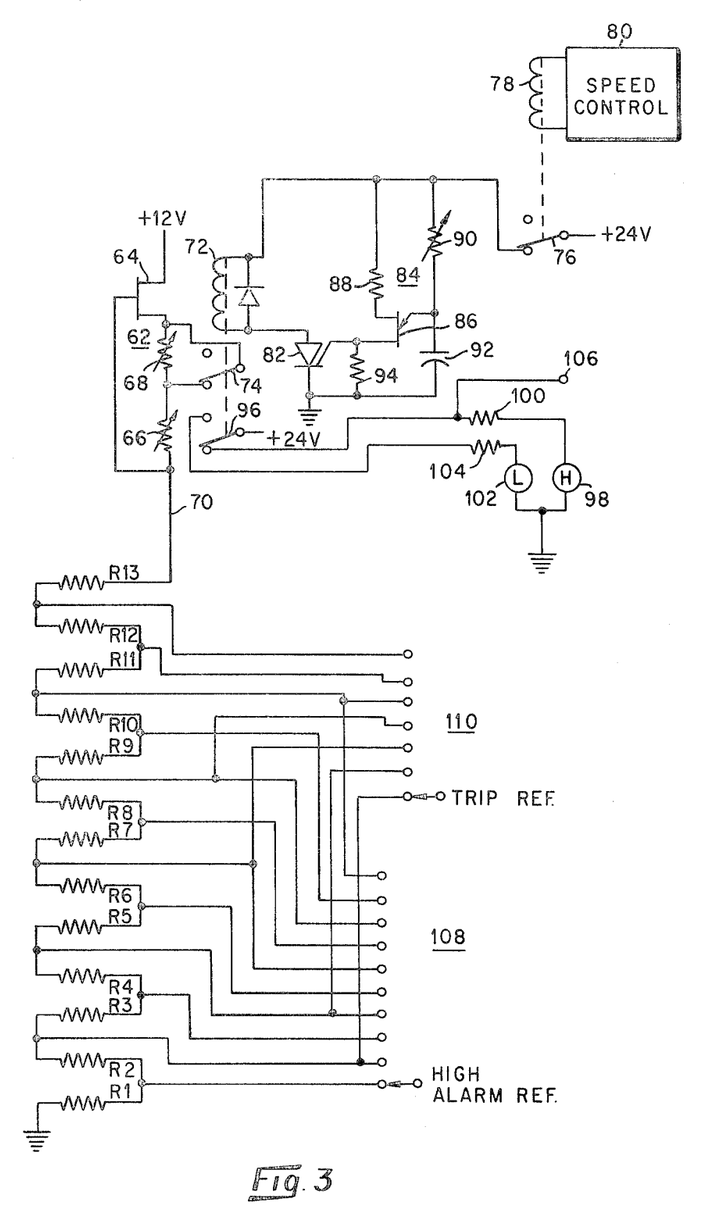
FIG. 3 is a schematic diagram of a reference voltage source as shown in block form in FIG. 1 for one channel.

Referring now to FIG. 3, there is shown a schematic diagram of a reference voltage source 59 for one channel. As shown by the lines from block 59 in FIG. 1, each channel has a separate set of reference voltages, one for the high level alarm and one for the trip level alarm. These reference voltages are produced by applying a constant current from a current regulator 62. The current regulator 62 consists of a field effect transistor (FET) 64 connected in series with either a single potentiometer 66 for single machine speed monitoring or dual potentiometers 66 and 68, as shown in FIG. 3, for dual speed monitoring. Dual speed operation requires that the vibration monitor provide the same degree of protection at either operating speed. The sensor 5 output changes with a change in operating speed, thus the signal conditioner output will reflect this change. The same amplitude of vibration, at two different operating speeds, will produce two different output voltages from the signal conditioner 41. Therefore, the reference voltages must change.

Single speed operation requires only one set of reference voltages, a single potentiometer, such as potentiometer 66, in series with the FET 64 can be used to establish them. Just as the meter calibration must be changed, so must the reference voltages for proper dual speed operation on any multiple speed operation. The vibration monitor used for this type operation must be capable of allowing for speed changes, both from low to high and from high to low without misoperation. When the speed change is from low to high, the sensor 5 output will increase very rapidly. This requires the reference voltages to be increased in like manner. A speed change from high to low requires the reference voltages not to be lowered prior to the time the drive train reaches the reduced speed.

With this in mind the following circuit has been provided which controls the reference voltages for a dual speed range monitoring system. The gate lead FET 64 is connected to potentiometer 66 at the opposite end from its series connection with potentiometer 68 to produce a constant current flow from the +12 volts source to line 70, the output of the regulator 62.

The output at line 70 is controlled by a relay 72 which has a set of normally closed contacts 74 connected across potentiometer 68. One side of relay 72 is connected to a +24 volt supply through a set of normally closed contacts 76 of an auxiliary relay 78. Relay 78 is controlled by a speed control 80 which may be part of the drive train switch gear (not shown) such that it is energized at the higher operating speed for a dual speed system. The other terminal of relay 72 is connected through a silicon control rectifier (SCR) 82 to ground potential. The gate electrode of SCR 82 is connected to a timing circuit 84. The timing circuit 84 consists of a unijunction transistor 86 having its base two electrode connected to the +24 volt supply line through a resistor 88 and the base one electrode connected to the gate electrode of SCR 82. The emitter electrode of transistor 86 is connected to the +24 volt supply through a variable resistor 90 and to ground through a capacitor 92. A resistor 94 is connected between the gate electrode of SCR 82 and ground potential.

When the +24 volts is supplied through contacts 76, capacitor 92 is charged at a rate which may be adjusted by variable resistor 90, approximately 2 to 15 seconds, a voltage at which the unijunction fires, thereby triggering SCR 82 to fire by applying a positive signal to the gate electrode. The firing of SCR 82 energizes relay 72 which remains energized until contacts 76 of relay 78 are again opened. Energizing relay 72 removes the short circuit, relay contacts 74 open from around potentiometer 68, placing potentiometer 68 in series with potentiometer 66. Relay 72 will drop out, short out potentiometer 68 the instant power is removed by opening contacts 76.

Relay 72 controls the reference voltage levels for dual speed operation. When the speed control 80 switches the motor (not shown) to high speed, relay 78 is energized, contacts 76 open and relay 72 drops out shorting potentiometer 68 and instantly increasing the current to output line 70 to the high speed reference level. When the drive train is switched to the lower speed level, relay 78 is deenergized and the +24 volt supply is connected through contacts 76 to the timing circuit 84 and relay 72. After the time delay, slow-down period, relay 72 is energized placing potentiometer 68 in series with potentiometer 66, thereby decreasing the current at line 70 to the low speed reference level. The action of the timing circuit 84 prevents a false alarm during the drive train slow-down period to the lower speed level.

Relay 72 has a second set of contacts 96 which in its deenergized position supplies +24 volts to a high speed indicator light 98 through a resistor 100 and in the energized position supplies +24 volts to a low speed indicator light 102 through a resistor 104. An auxiliary output terminal 106 is connected at resistor 100 which may be used to operate an automatic metering circuit range changer relay (not shown) so that the metering circuit calibration is maintained consistent with the remainder of the monitoring circuit.

The remainder of the reference voltage source shown in FIG. 3 consists of a series connection of resistors R1 through R13 connected between the regulation circuit output line 70 and ground potential and selector switches 108 and 110. Switch 108 is used to select the high alarm reference voltage from the accumulated voltage drop across resistors R1 through R10, each resistor connected at its higher potential terminal to respective terminals of selector switch 108. The selector arm of switch 108 is connected to the amplifier 55 (FIG. 1) of the appropriate channel. The terminals of selector switch 110 are connected in a similar manner to resistors $R_2$, $R_4$, $R_6$, $R_8$, $R_{10}$, $R_{11}$ and $R_{12}$ so that the trip reference voltage may be selected. The selector arm of switch 110 is connected to amplifier 53 of the appropriate channel.

Referring again to FIG. 1, the output of the trip level detector, operational amplifier 53, is connected through a diode 69 (anode connected to the amplifier output) to pass the positive signal to a trip relay 71 which may be used in a conventional manner to trip the system power supply, a drive train being monitored, etc. It will also be understood that separate trip relays may be provided for each channel or selected groups of channels, depending upon the particular application.

In order to indicate a trip alarm the cathodes of diodes 69 are commonly connected through a voltage divider network to the gate electrode of a silicon controlled rectifier (SCR) 73 which is connected in series with a lamp 75 for a visual indication of a trip condition. Power supply for the indicator of this lamp and other lamp indicators to be described hereinbelow is supplied from a system power source 77 through a voltage monitor 79 and an alarm reset switch 81. The monitor 79 indicates to an operator the condition of the power source. The trip lamp indicator 75 and SCR 73 are connected in series between the power supply line 83 and ground potential.

Referring now to the high vibration level detectors, the outputs of operational amplifiers 55 are connected through diodes 85 (anode connected to the amplifier output) to the gate electrode of another SCR 87 which is connected in series with a high vibration indicator lamp 89 from the supply line 83 to ground potential.

The low vibration level detectors are connected in a similar manner by connecting the outputs of operational amplifiers 57 through diodes 91 to the gate electrode of an SCR 93 which is connected in series with a low vibration indicator lamp 95 from the supply line 83 to ground potential. In each of the above alarm conditions the corresponding lamp is lighted by a positive signal from the output of one of the appropriate operational amplifiers being applied to the corresponding SCR gate electrode causing the SCR to conduct. The SCR will continue to conduct even though the gate signal is removed until the reset switch is activated momentarily to turn the SCR off.

In order to locate a sensor 5 which has indicated an alarm condition, an indicator lamp or lamps may be provided for each channel or the channels may be divided into appropriate groups, as shown in FIG. 1, indicating a particular machine, a group of machines in one area of a plant, etc., and all of the channels in a particular group are connected to activate one of a plurality of group lamps, such as lamps A, B, or C when an alarm condition exists in that group. In the example shown in FIG. 1, the thirty channels represented are divided into three groups (A, B, and C) of ten each. Each of the 10 channels of a group is connected to activate a separate one of ten point indicator lamps (1–10). For example, the outputs of each of the operational amplifiers 53, 55 and 57 of channel No. one (sensor No. 1) are connected to a common lead 97 through isolating diodes 99, 101 and 103, respectively. Lead 97 is then connected through an isolating diode 105 to the gate electrode of an SCR 107. SCR 107 is connected in series with point lamp 1 between the power lead 83 and ground potential such that an alarm condition in channel 1 lights point lamp No. 1. Similarly, line 97 is connected through another isolating diode 109 to the gate electrode of an SCR 111 which is connected in series with group lamp A between the power lead 83 and ground. Thus, an alarm in channel 1 lights lamp A and point lamp No. 1. Each of the channels, not shown, is similarly connected such that each channel may be identified as further illustrated by the connection of channel thirty through diodes 105' and 109' to the gate electrodes of SCR's 113 and 115, respectively. Point thirty is seen to be identified as being in group C, point No. 10.

It is further desirable to provide a remote audible alarm for any one of the alarm conditions to immediately notify an operator of an alarm condition. This is accomplished by connecting lead 97 of each channel through separate isolating diodes 117 to ground through a resistor 120 and to the input of an alarm driver 119 through a capacitor 122. The alarm driver 119 is a non-inverting operational amplifier configuration with a feedback gain adjustment. The output of driver 119 is connected to the gate electrode of an SCR 121 which is connected in series with a horn, bell, or other audible alarm 123 between the power lead 83 and ground potential. A pulse through a capacitor 122 will turn the alarm 123 on and it will remain on until reset. It will be understood that this alarm may be connected through a separate supply and reset switch so that the audible alarm may be controlled separate.

Figure 4:
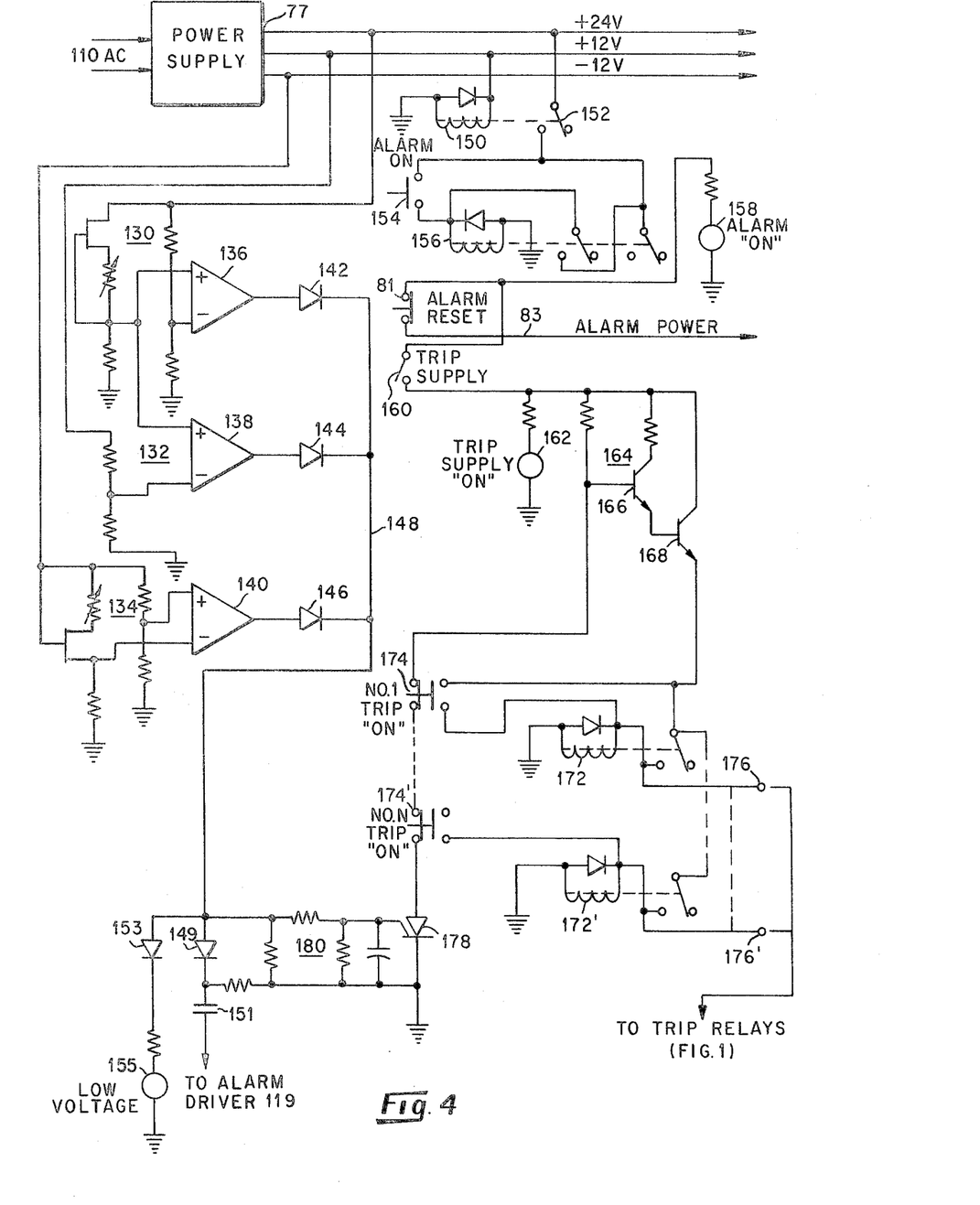
FIG. 4 is a schematic diagram of the power supply and voltage monitoring circuit of FIG. 1.

Referring now to FIG. 4, there is shown a schematic diagram of the power supply 77 and voltage monitor 79. The power supply 77 provides a +24 volt, a +12 volt and −12 volt output for all the system electronics. Each of these outputs is monitored by comparator circuits 130, 132 and 134, respectively, which compares the voltage with set reference voltages applied to the non-inverting inputs of operational amplifiers 136, 138 and 140, respectively, by applying the voltages through dividers to the inverting inputs of amplifiers 136, 138 and 140, respectively. If one of the supply voltages drops below the set reference level the output of the corresponding amplifier will go positive. The outputs of amplifiers 136, 138 and 140 are connected through diodes 142, 144 and 146, respectively, to a common line 148 so that a positive output is applied to line 148 in case of a low voltage alarm condition. Line 148 is connected through a diode 149 and a capacitor 151 to the alarm driver 119 input as shown in FIG. 1. A pulse through capacitor 151 will turn the alarm 123 on. Line 184 is further connected through a diode 153 and a low voltage indication lamp 155 to ground. The system is designed so that when the power supply 77 is first turned on the voltage will not be applied to any part of the monitor circuit that produces any type of alarm or control (trip action). A relay 150 is connected between the +12 volt and −12 volt power supply 77 outputs and is picked up when these voltages are present. Relay 150 has a set of normally open contacts 152 which when closed applies the +24 volts to an alarm pushbutton switch 154. This switch is connected through a relay 156 to ground. Relay 156 has two sets of normally open contacts which lock in the relay when the switch 154 is momentarily depressed through one set and applies the +24 volts to the alarm power line 83 (FIG. 1) through alarm reset switch 81, also shown on FIG. 1, and to an alarm "on" lamp indicator 158. The alarm power, once it is turned "on," cannot be turned "off." Depressing the alarm reset switch 81 removes the alarm power from line 83 and resets all alarm indicators. When switch 81 is released all alarm conditions still present will be indicated again.

The remainder of the circuit of FIG. 4 controls the action of trip relays 71 (FIG. 1) in that the trip supply power is controlled to prevent a false trip of the drive train. When the system is first turned on, or under low power supply voltage conditions, the trip relays are prevented from acting until set by the following circuit. The trip supply voltage is turned "on" by closing a trip supply switch 160 connected at one side to the +24 volt supply line through contacts of relay 156. The other side of switch 160 is connected to ground through a trip supply "on" indicator lamp 162 and to an electronic switching circuit 164 consisting of transistors 166 and 168 connected in an emitter follower configuration. When the trip supply switch is closed, the +24 volts is applied to the switching circuit 164, turning both transistors 166 and 168 on and applying the trip supply voltage to a trip supply line 170. The trip supply line 170 is connected to separate control relays 172, one control relay for each trip relay of block 71 (FIG. 1), through normally open contacts of pushbutton trip "on" switches 174. As pointed out above the number of trip relays 71 and likewise the number of trip control relays 172 will depend on the particular drive train application. In FIG. 4, only two trip control relays are shown to simplify the drawing, but it will be understood that any number of trip and trip control relays may be added to the system.

Relays 172 each have a set of normally open contacts connected between line 170 and the corresponding output terminal 176 and their corresponding relay 172 so that when the switch 174 is depressed, the corresponding relay 172 is picked up and locked in and the trip supply voltage is applied to the corresponding drive train trip relay, shown as block 71 of FIG. 1, so that the drive train trip relay may be actuated by the detection of a trip alarm at the output of one of the trip level detector amplifiers 53 (FIG. 1).

To prevent a false trip when the power supply voltage drops to low, the low voltage alarm line 148 is also applied to the gate lead of an SCR 178 through a filter circuit 180. SCR 178 has its cathode connected to ground and the anode connected to the base of transistor 166 of the switching circuit 164 through a series of normally closed contacts of the trip "on" switches 174. The detection of a low voltage condition will fire SCR 178 applying ground to the base of transistor 166 and turning switch 164 "off." This action will deenergize all of the trip control relays 172 and prevent the trip relays from falsely tripping the drive train. SCR 178 is then reset when one of the trip "on" switches 174 is momentarily depressed to open the normally closed contacts.

One additional feature of this monitoring system which has not been depicted in the drawings, but may be added to the circuit, is an output buffer circuit which may be connected to the output of any one of the signal conditioners 41 (FIG. 1) or any number of buffer circuits separately connected to any one or all of the signal conditioners. The output buffer circuit produces a D.C. output signal that can be used for remote data collection or to drive strip chart recorders without loading the signal conditioner outputs. These circuits are typically operational amplifiers connected as voltage followers to permit remote transmission of the conditioner data signals.

In operation, assuming that each of the sensors has been calibrated by choice of the proper calibrating resistor 11 (FIG. 2), the gain for each channel has been set by adjusting the gain potentiometer 47 of the signal conditioners and the various reference voltages have been set, the circuit is set into operation with all alarm indicators reset. A reading may be taken on meter 42 for each sensor 5 by selecting each sensor output through selector switch 31. The circuit is then left to monitor all of the sensors 5 continuously. The low vibration level detector is essentially a self checking circuit. The reference voltage levels for the low vibration level detectors are set by the values of resistors 65 and 67 so that when the output of a signal conditioner 41 drops below the reference voltage level the output of operational amplifier 57 goes positive, sounding the alarm 123, lighting the corresponding point lamp and group lamp and the low vibration indicator lamp 95. The function of the low vibration detector is to indicate the near absence of an output from the signal conditioner 41. Failure of the signal conditioner to produce an output above the fixed reference level is an indication of one of the following faults: (1) failure of the signal conditioner; (2) an open input cable; (3) failure of the sensor; (4) machine vibration below the normal level; or (5) machine not operating. Any of these faults constitutes an alarm condition; however, Nos. 4 and 5 may not be conditions of potential machine failure. Faults Nos. 1 through 3 are indications of monitor failure and loss of machine protection. Since the monitor system cannot be considered reliable unless it can consistently produce an alarm when an input voltage exceeds the selected limits, this self checking feature notifies the operator that a fault condition exists that should be attended to immediately. The sensors 5 themselves may be cross-checked with the metered indication by setting the selector switch 31 to the channel number indicating an alarm.

The high vibration and trip vibration reference voltage levels are set individually from the reference voltage source 59 as described with reference to FIG. 3. These voltages may be readily changed simply by selecting the appropriate output voltage level on the line connected to the particular operational amplifier 53 or 55.

Once the ouput of a signal conditioner 41 exceeds the corresponding high vibration reference voltage level the output of operational amplifier 55 goes positive causing both diodes 85 and 101 to conduct. The signal passing through diode 85 is applied to the alarm driver 119 raising the output of the driver to a level which will switch the SCR 121 by applying a sufficiently positive signal to the gate thereof. Once the SCR 121 is triggered the alarm 123 will sound until the alarm system is reset by momentarily removing the power by reset switch 81, assuming the fault has been removed. Assuming sensor No. 1 detects a high vibration level, the signal passing through diode 101 causes both diodes 105 and 109 to conduct applying the positive signal to the gates of both SCR's 111 and 107, thereby lighting the group lamp A and point lamp 1 to indicate that sensor No. 1 is detecting the high vibration level. The signal passing through diode 85 is applied to the gate of SCR 87 which, when triggered, lights the high vibration indicator 89 to identify the alarm condition.

If the vibration level continues to rise it will eventually exceed the trip voltage reference level applied to the (−) input of operational amplifier 53, causing the output of amplifier 53 to go hard positive. This causes diode 69 to conduct applying the positive signal to the corresponding trip relay 71 to shut down the machine or machines as the case may be. This signal is simultaneously applied to the gate of SCR 73 to turn on the trip indicator lamp 75, indicating to the operator that a machine has been shut down. The system is redundant in that either the low, high or trip condition will sound the alarm 123 and light the appropriate group lamp and point lamp, since the output of each of the operational amplifiers 53, 55 and 57 is connected through diodes 99, 101 and 103, respectively, to common line 97.

As pointed out above, the output signal from the signal conditioner 41 is a D.C. voltage with a small ripple. When this voltage is below the high or trip reference voltage levels, the outputs of operational amplifiers 53 and 55 are negative, thus the various diodes connected to the outputs are reverse biased. When the signal conditioner 41 output voltage level exceeds a high or trip reference voltage level, the output of the corresponding detector goes positive and likewise when the output of the signal conditioner falls below the low vibration detector level the output of detector 57 goes positive. The output of a detector switches at the time of crossover when the input becomes greater than the high or trip reference voltage level or lower than the low vibration reference voltage.

The crossover is very slow when the vibration level is changing very slowly; however, the ripple on the input signal will produce not only a rapid crossover as each ripple peak exceeds the reference voltage, but will continue to produce crossover until the ripple is totally in excess of the reference voltage. Thus, the ripple action produces at the output of the detectors a succession of positive going signals capable of actuating the alarm circuits. The ripple magnitude wil typically be the equivalent of a vibration level change of 0.0001 of an inch peak-to-peak (0.015 MV DC).

While there has been shown what is considered the preferred embodiment of the invention, various modifications and changes may be made in the circuit as suggested throughout the specification and the number of detection channels may vary without departing from the spirit and scope of the invention as set forth in the following claims.

What is claimed is:

1. A multipoint vibration monitoring system for monitoring vibrations in a plurality of rotating machines, comprising:

a plurality of vibration sensors connected at predetermined monitoring points to said rotating machines, each of said sensors including a magnetic core, a movably mounted winding disposed about said core and constrained to move in a single plane so that movement of said winding relative to said core due to vibration causes an A.C. signal to be generated therein proportional to the speed of the corresponding one of said plurality of machines to which said sensor is connected and magnitude of vibration in said single plane and output circuit means connected to said winding;

a plurality of signal level detector channels connected to said output circuit means corresponding ones of said plurality of sensors, each of said detector channels including:

a. a low vibration level detector means responsive to a selected signal level below a normal output level of the corresponding sensor for generating a low vibration level alarm signal at an output thereof when the output of said corresponding sensor falls below said selected signal level, b. a high vibration level detector means responsive to another selected signal level above said normal output level of said corresponding sensor for generating a high vibration alarm signal at an output thereof when the output of said corresponding sensor exceeds said another selected signal level, and c. a trip vibration level detector means responsive to a selected maximum signal level output above said another selected signal level of said corresponding sensor for generating a trip signal at an output thereof when the output of said corresponding sensor exceeds said selected maximum signal level;

an alarm indicator means including a plurality of location indicators connected to the outputs of each of said signal level detector channels for indicating a particular one of said sensors detecting an alarm condition and indicating the activated one of said level detector means;

switching means connected to the outputs of each of said maximum vibration level detectors of said signal level detection channels for disconnecting the power to a corresponding one of said machines in response to said trip signal from the corresponding one of said signal level detector channels.

2. The multipoint vibration monitoring system as set forth in claim 1 wherein said output circuit means of each of said plurality of vibration sensors includes a calibrating resistor connected in parallel with said winding and having a value which provides a signal at the sensor output which is linearly related to the amplitude of the vibration detected by said sensor.

3. The multipoint vibration monitoring system as set forth in claim 2 further including means for providing an indication of the amplitude of vibration of a selected one of said sensors and means for selectively connecting any one of the outputs of said sensors to said amplitude indicating means.

4. The multipoint vibration monitoring system as set forth in claim 3 further including a plurality of signal conditioners connected in series with the outputs of corresponding ones of said plurality of sensors, each of said signal conditioners including an operational amplifier having an inverting and non-inverting input and an output, said non-inverting input connected to a corresponding one of said sensors, a diode having its anode lead connected to the output of said operational amplifier so as to pass a positive voltage signal at said operational amplifier output, a potentiometer connected between the cathode of said diode and ground potential having the adjustable arm thereof connected to said inverting input of said operational amplifier, a resistor connected at one end to the cathode of said diode, a capacitor connected between the other end of said resistor and ground potential, and an output terminal connected to the ungrounded side of said capacitor, whereby a D.C. signal is provided at said output terminal which is proportional to the average positive peak of said A.C. signal at the output of said corresponding one of said plurality of sensors.

5. The multipoint vibration monitoring system as set forth in claim 4 wherein each of said high vibration level detector means and said trip vibration level detector means of each of said plurality of signal level detector channels includes a comparator circuit having first and second inputs and an output, said comparator circuit producing a positive signal at the output thereof when the signal level at said first input is more positive than the signal level at said second input and producing a negative signal at the output thereof when said first input is less positive than the signal level at said second input, said first inputs of said comparator circuits connected to said output terminal of the corresponding one of said signal conditioners, wherein each of said signal level detector channels includes a reference voltage generating means for providing first and second selectable reference voltages equal to said another selected and said selected maximum signal levels, respectively, at first and second outputs, respectively, said first output of said reference voltage generating means connected to said second input of said comparator circuit of said high vibration level detector means, and said second output of said reference voltage generating means connected to said second input of said comparator circuit of said trip vibration level detector means, and wherein each of said low vibration level detector means of each of said plurality of signal level detector channels includes a further comparator circuit having first and second inputs and an output, said further comparator generating either a positive or negative signal at the output thereof depending upon whether the signal level at said first input of said further comparator is more positive or less positive, respectively, than the signal level at said second input of said further comparator, said second input of said further comparator circuit connected to said output terminal of said corresponding one of said signal conditioners, and a further reference voltage source connected to said first input of said further comparator circuit for providing a reference voltage at an output thereof equal to said selected signal level.

6. The multipoint vibration monitoring system as set forth in claim 5 wherein said plurality of location indicators of said alarm indicator means includes a first plurality of visual location indicators connected individually to selected equal numbered groupings of said plurality of signal level detector channels and a second plurality of visual location indicators each connected to individual ones of said plurality of signal level detector channels of each of said groupings of detector channels so that an alarm condition produced by any one of said plurality of sensors is located by activation of the corresponding one of said first plurality of visual location indicators and the corresponding one of said second plurality of visual location indicators.

7. The multipoint vibration monitoring system as set forth in claim 6 wherein said indicator means for indicating the activated one of said level detector means includes a low vibration level visual indicator and a first circuit means for detecting a positive signal at the output of any one of said low vibration level detector means and switching said low vibration level visual indicator on in response thereto, a high vibration level visual indicator and a second circuit means for detecting a positive signal at the output of any one of said high vibrational level detector means and switching said high vibration level visual indicator on in response thereto, and a trip vibration level visual indicator and a third circuit means for detecting a positive signal at the output of any one of said trip vibration level detector means and switching said trip vibration level visual indicator on in response thereto.

8. The multipoint vibration monitoring system as set forth in claim 7 further including a power supply for providing a D.C. supply voltage at outputs thereof to the circuit components of said vibration monitoring system, a voltage monitoring means connected to the outputs of said power supply for providing an alarm indication when said D.C. output voltages of said power supply drop below a preselected level and disabling said switching means when said power supply voltage drops below said preselected level so as to prevent a false trip of said machines.

9. The multipoint vibration monitoring system as set forth in claim 8 further including an audible alarm and circuit means responsive to a positive output signal from any one of said comparator circuits of any one of said signal level detector channels for turning said alarm on.

10. The multipoint vibration monitoring system as set forth in claim 9 where each of said reference voltage generating means further includes means for automatically changing the reference voltages at said first and second outputs of said reference votage generating means in response to a change in speed of a corresponding one of said rotating machines so as to prevent a false vibration alarm indication.

* * * * *